US005435512A

United States Patent [19]

Rudy, Jr. et al.

[11] Patent Number: 5,435,512

[45] Date of Patent: Jul. 25, 1995

[54] MOUNTING SYSTEM FOR CURRENT MODE COUPLER

[75] Inventors: William J. Rudy, Jr., Annville; Howard R. Shaffer, Millersburg; Daniel E. Stahl, Harrisburg, all of Pa.

[73] Assignee: The Whitaker Corporation, Wilmington, Del.

[21] Appl. No.: 226,220

[22] Filed: Apr. 11, 1994

Related U.S. Application Data

[62] Division of Ser. No. 996,558, Dec. 24, 1992, abandoned.

[51] Int. Cl.⁶ .......... F16M 13/00

[52] U.S. Cl. .......... 248/221.3; 248/27.3

[58] Field of Search .......... 248/220.2, 221.1, 221.3, 248/681, 73, 316.4, 231.4, 187, 500, 510, 580, 222.2, 229, 27.3; 174/158 R

[56] References Cited

U.S. PATENT DOCUMENTS

| | | | |
|---|---|---|---|
| D. 218,973 | 10/1970 | Pritulsky | D26/1 |
| 2,891,103 | 6/1959 | Swengel | 174/153 |
| 3,530,426 | 9/1970 | Snyder, Jr. | 339/128 |
| 3,560,908 | 2/1971 | Dell et al. | 339/91 |
| 3,569,909 | 3/1971 | Garver | 339/91 |
| 3,612,462 | 10/1971 | Mooney | 248/187 X |
| 4,113,217 | 9/1978 | O'Connell | 248/221.3 |
| 4,128,224 | 12/1978 | Guichard | 248/316.4 |
| 4,264,827 | 4/1981 | Herzog | 307/17 |
| 4,268,108 | 5/1981 | Debaigt | 248/221.3 X |
| 4,376,560 | 3/1983 | Olsson et al. | 339/17 CF |
| 4,454,382 | 6/1984 | Borne et al. | 174/158 R |
| 4,477,142 | 10/1984 | Cooper et al. | 339/125 R |
| 4,618,915 | 10/1986 | Bury | 248/221.3 X |
| 4,647,262 | 3/1987 | Yokota | 411/44 |
| 4,761,144 | 8/1988 | Hunt, III et al. | 439/545 |
| 4,813,642 | 3/1989 | Matsui | 248/500 X |
| 4,904,879 | 2/1990 | Rudy, Jr. et al. | 307/17 |
| 5,105,095 | 4/1992 | Rudy, Jr. et al. | 439/571 |
| 5,112,247 | 5/1992 | Rudy, Jr. et al. | 439/571 |
| 5,241,219 | 8/1993 | LeBaron et al. | 307/104 |
| 5,263,535 | 11/1993 | Philo et al. | 248/73 |
| 5,332,183 | 7/1994 | Kagayama | 248/187 |

FOREIGN PATENT DOCUMENTS

| | | | |
|---|---|---|---|
| 856059 | 8/1981 | U.S.S.R. | 439/573 |

OTHER PUBLICATIONS

*AEEC Letter No. 87-094/SAI-309*, Jul. 17, 1987; pp. 1, 7, 9; Aeronautical Radio Inc., Annapolis, Md.

*AEEC Letter No. 87-122/SAI-313*, Sep. 17, 1987; pp. 1, 38–44; Aeronautical Radio Inc., Annapolis, Md.

*AEEC Letter No. 88-077/SAI-331*, May 20, 1988; pp. 1,12; Aeronautical Radio Inc., Annapolis, Md.

*Primary Examiner*—Karen J. Chotkowski

*Attorney, Agent, or Firm*—Anton P. Ness

[57] ABSTRACT

An improved current mode coupler comprising a base (100) and a housing (300) for current mode coupling onto a twisted pair cable (22) of a data bus (20). The coupler base (100) is mountable to a panel (224), having movable mounting body members (106) and a fixed engaging member (108) and is capable of single-motion mounting to the panel, which has a plurality of predetermined apertures (228) with engagement surfaces (226,227) which correspond to the mounting body members (106) and the fixed engaging member (108). The mounting body members (106) are movable within and removable from the coupler base (100) and contain a spring (218) which exerts a force in the direction away from the fixed engaging member (108) ensuring that the coupler base (100) is securely mounted to the panel (224) by engaging a groove (124) on the mounting feet (106) with an engagement surface (226) on the panel (224).

6 Claims, 15 Drawing Sheets

MOUNTING SYSTEM FOR CURRENT MODE COUPLER

This application is a Divisional of application Ser. No. 07/996,558, filed Dec. 24, 1992, now abandoned.

FIELD OF THE INVENTION

The present invention relates to the field of electrical connectors and more particularly to a system for mounting to a panel a noninvasive coupler for sensing and transmitting electrical signals from a conductor wires of a twisted pair cable of a data bus.

BACKGROUND OF THE INVENTION

Non-invasive data current mode couplers are planned to be used extensively aboard aircraft for transmitting signals from conductive wires of a twisted pair cable of a data bus. A current mode coupler typically includes a base to which is secured a housing to form an assembly for noninvasive coupling to a twisted pair of signal conductor wires of a closed loop data bus to read signals being transmitted therealong by a series of electromagnetic cores interlaced with loops of the twisted pair. The electromagnetic cores comprise pairs of opposing unique E-shaped electromagnets each member of which is disposed within one or the other of the base or housing. Opposing end faces of the legs of the E-shaped electromagnets engage each other by a resilient bias means after portions of the individual wires of the twisted pair of digital conductor wires at a selected location therealong are placed in formed twisted pair channels of a wire nest extending between the legs of the electromagnets in the base, so that one loop of the twisted pair cable is disposed in the wire nest.

The electronics housing includes an electronics package electrically connected to an electronic subassembly connected to a circuit board element. In turn, the electronic subassembly is electrically connectable at a connector interface of the housing with a cable assembly which extends to a corresponding control unit, with the control unit providing electrical power to the electronic subassembly as well as signal and ground connection. The current mode coupler also can transmit and amplify signals therealong by generating an appropriate electromotive force via an electromagnetic field, and also receive and therefore verify the signal it transmits.

For example, U.S. Pat. No. 5,105,095 describes a data coupler insert having conductive wires positioned within arcuate channels in the top surface of an elastomeric body in the coupler base formed to include channel intersections proximate cable exits adapted for accommodation of crossovers of the conductor wires at ends of a single loop of the cable, with one channel portion being a conductor diameter deeper than the other. Electromagnetic shielding by using metallic plating on the housing provides EMI/RFI protection. A resilient spring means biases the electromagnetic insert so as to bias together each electromagnet pair to form an electromagnetic core. Sealing means are used to position and seal the conductive wires in the assembly. A mounting means secures the coupler base to a panel, as also described in U.S. Pat. No. 5,112,247, and aligning means precisely secures the housing of the data coupler assembly to the base.

U.S. Pat. No. 4,904,879 describes a data current mode coupler, and method of making and assembling the coupler, for receiving signals from a conductor wires of a twisted pair of a data bus. The coupler assembly noninvasively couples the data bus to the conductor wires by using mating pairs of E-shaped electromagnets having windings about central legs of the electromagnets which are electrically connected to a control unit to sense and transmit signals along the data bus. A base having a cavity to receive conductor wires positioned adjacent to the lower electromagnets is mounted to a panel. A housing with upper electromagnets includes a circuit substrate having trace windings about substrate apertures, an electronic subassembly to which the windings are electrically connected to amplify transmitted and received signals, and a shielded electrical connector secured at a connector end connected to circuits of the electronic subassembly and matable with a connector of a cable extending to the control unit. The housing is releasably connected to the housing via a fastening means and securing means.

U.S. Pat. No. 4,264,827 discloses a method of sensing the transmission of low-level signal current through an electrical conductor without an electrical connection to the conductor, using a continuous closed loop conductor wire extending from a current source with coils of the conductor looped around magnetic coil articles connected to electronic devices, which arrangement senses changes in the electromagnetic field established by the current. The arrangement can be repeated at a plurality of locations spaced along the conductor without detrimental effect to the signal transmission, and can allow signaling of a plurality of electronic devices in response to the signal current passing through the conductor.

Such a current sensing system is desired to be placed aboard aircraft for use with black boxes and other electronic control units, as is disclosed in ARINC Standard 629 recently issued by the Airlines Electronic Engineering Committee (AEEC) of Aeronautical Radio, Inc. (ARINC) of Annapolis, Md., and AEEC Letters Nos. 87-094/SAI-309, 87-122/SAI-313, and 88-077/SAI331, which are incorporated herein by reference. Such a system may also be used in other environments where it is desired that a single closed loop data bus be used.

The couplers above provide important advantages in operation and assembly. Nevertheless, none of these data current mode couplers uses single-motion panel-mounting means, a wire retainer disposed to secure the conductors of the twisted pair in the elastomeric wire nest for wire positioning within the wire channels, and a housing having improved heat transfer characteristics and electromagnet shielding using a finned housing. It is desired to devise an improved noninvasive coupler for sensing and transmitting electrical signals from a twisted pair of a data bus, which provides these important advantages.

SUMMARY OF THE INVENTION

A coupler base for mounting to another member, such as a panel having a plurality of predetermined engaging surfaces formed therein, comprises a pair of receiving channels on one end of the coupler base; a fixed engaging member extending from the coupler base remote from the one end to correspond to at least one of the engaging surfaces of the panel when the coupler base is positioned adjacent the panel to be mounted thereto; a movable mounting means positioned in each receiving channel of the coupler base, each movable mounting means extending from the coupler base to correspond to at least one of the engaging surfaces of the panel when the coupler base is positioned adjacent the panel to be mounted thereto; and resilient bias means positioned between the movable mounting means and the corresponding receiving channel of the coupler base to exert a force between the respective movable mounting means and the fixed engaging member to increase the distance therebetween, the resilient bias means being compressible under force so as to decrease the distance therebetween; whereby the resilient bias means is compressed to allow both the fixed engaging member and the movable mounting means to be positioned adjacent to the predetermined engagement surfaces of the panel, each resilient bias means expanding after positioning both the movable mounting means and the fixed engaging member within respective engagement surfaces to force both the fixed engaging member and the mounting means into engagement with the engagement surfaces to secure the coupler base to the panel.

The embodiments above provide a number of significant advantages. The coupler base assembly includes a single-motion mounting means having a fixed engaging member and a spring-loaded movable mounting means which quickly and accurately positions the coupler base assembly onto a panel. Furthermore, upon positioning the coupler base onto the panel the spring-loaded movable mounting means in conjunction with the fixed engaging member automatically secures the coupler base to the panel, thereby eliminating the requirement of additional mounting procedures. As a result, the time required to install the coupler is minimized. Similarly, the coupler base may be removed in a single motion for replacement.

Another advantage of the single-motion mounting means of the present invention is the spring-loaded movable mounting means provides means for absorbing shock and vibration. More specifically, as the position of the panel engaging surfaces fluctuate due to shock or vibration, for example, from local atmospheric turbulence, the spring-loaded movable mounting means will move in accordance with the movement of the panel engaging surfaces. However, due to the resilient bias means, the locking surface of the movable mounting means remains engaged with the panel engaging surface at all times. As a result, the coupler base remains secured to the panel as the spring-loaded movable mounting means absorbs any shock or vibration. Furthermore, the shock absorption provided by the present invention substantially reduces the risk of the coupler base mounting means being broken due to shock or vibration.

The invention itself, together with further objects and attendant advantages, will best be understood by reference to the following description taken in conjunction with the accompanying drawings.

DETAILED DESCRIPTION OF THE INVENTION

Figure 1:
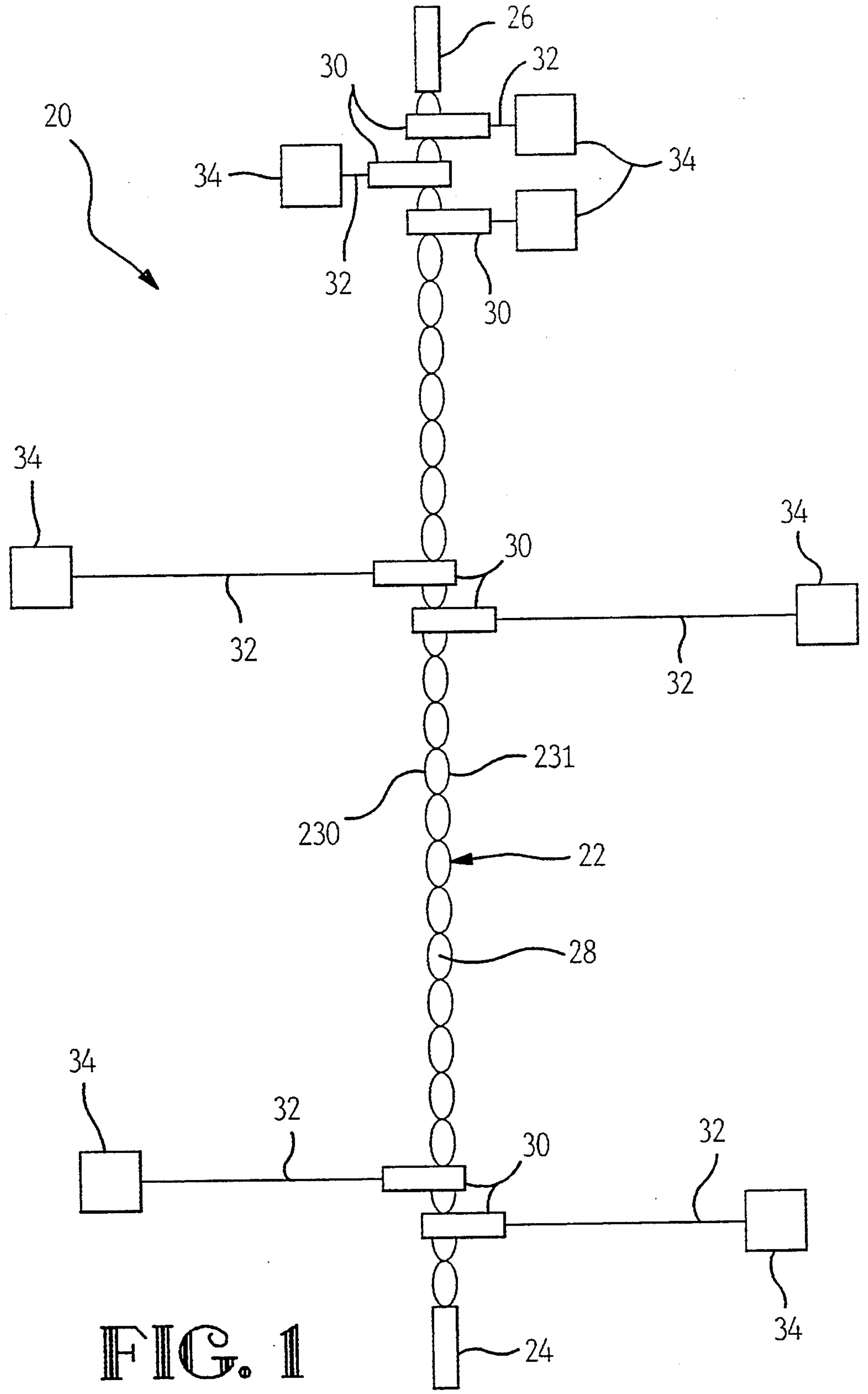
FIG. 1 is a diagrammatic view of a data bus system.

Turning now to the drawings, FIG. 1 shows a representation of the data bus system 20 to which the present invention is relevant. A twisted pair cable 22 of conductor wires 230,231 extends between end terminations 24,26 and comprises a closed loop, and a plurality of loops 28 occur at selected spacing, each loop having a length and shape selected to minimize impedance effects and signal reflection. At selected loops 28 are mounted current mode coupler assemblies 30 each having a width preferably less than a loop length to avoid distorting the desired loop length and shape, thereby avoiding impedance effects and signal reflection. Stub cables 32 extend from respective coupler assemblies 30 to respective control units 34 such as black boxes, providing electrical connections therebetween. Each control unit 34 preferably has a Serial Interface Module (not shown) for modifying digital signals from Manchester Encoded Signals to be transmitted along the data bus system, and correspondingly for translating such encoded signals into digital signals for integrated circuits within the control unit. Each control unit 34 will also provide power for the amplifiers in a respective coupler assemblies 30 to boost received and transmitted signals.

Figure 2:
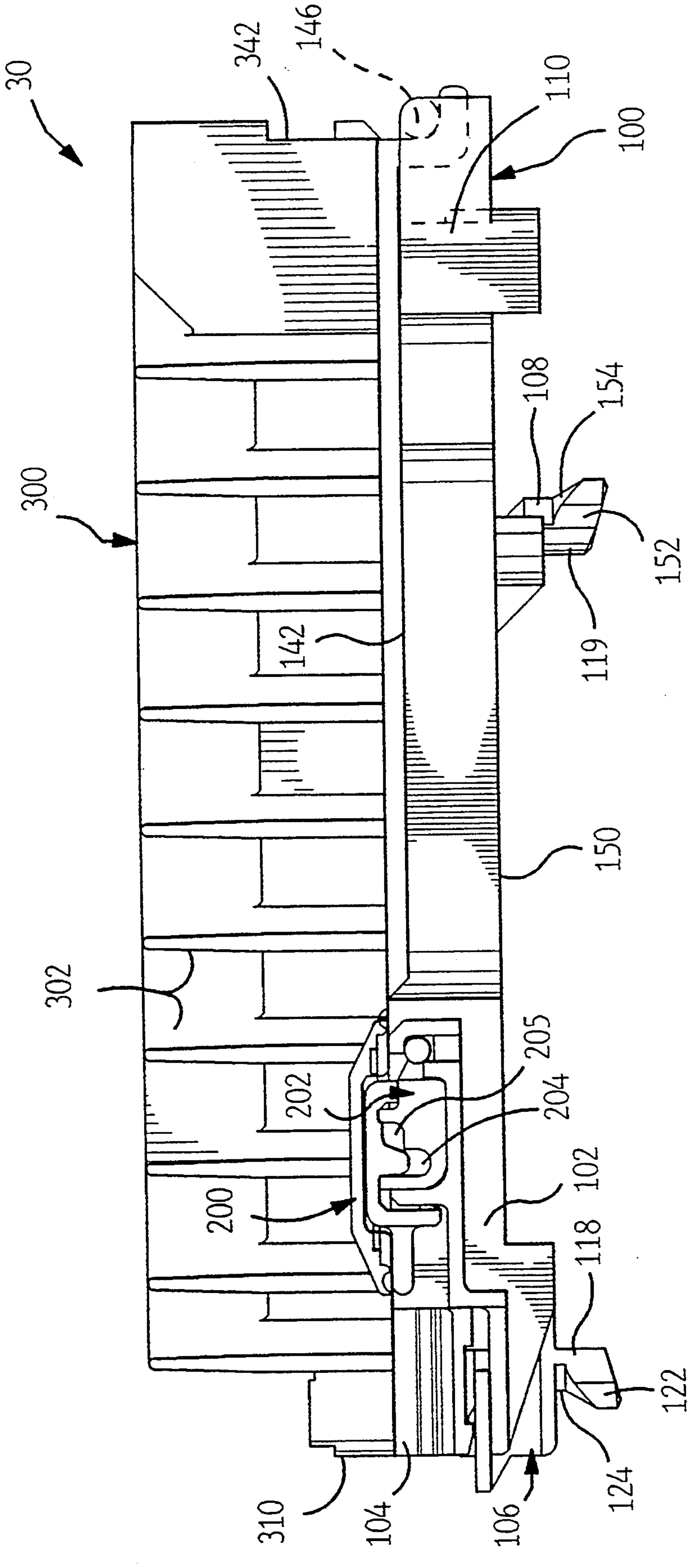
FIG. 2 is an elevation view of a current mode coupler assembly of the present invention.
Figure 3:
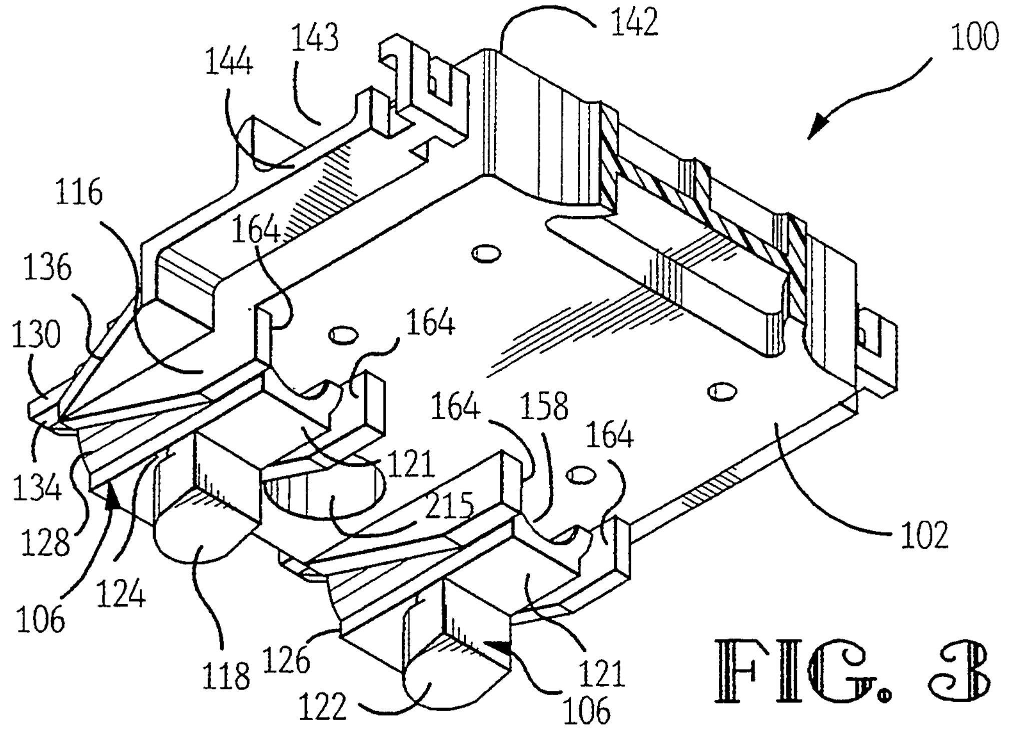
FIGS. 3 and 4 are partial bottom and top isometric views of a base of a coupler taken from the twisted pair end of the base and showing and the single-motion mounting means of the present invention.

The coupler assembly 30 of the present invention is coupled to the twisted pair 22 of conductor wires 230,231 of a data bus system 20 such as that of FIG. 1 and as disclosed in U.S. Pat. Nos. 4,904,879 and 4,264,827, and the AEEC Letters referred to herein.. The coupler assembly 30 is non-invasively affixed at a selected location therealong at a loop 28 of the twisted pair. Each coupler assembly 30 comprises a coupler base disposed to include a elastomeric member or wire nest having at least one, and preferably a pair of "E" shaped electromagnets with channels coursing therealong to receive respective conductor wires of a twisted pair cable. A housing assembly 300 is disposed to be removably secured to the base, as shown in FIG. 2. Housing 300 contains an electronics package containing electronic components within an enclosed shielded cavity; the electronics package includes circuitry having windings around "E" shaped electromagnets and electrical connection ports.

The electronics package is a printed circuit board element upon which are mounted an array of various electrical and electronic components for amplifying the signals received and sent by the coupler along the data bus of FIG. 1. One such electronics package is disclosed in U.S. Pat. No. 4,904,879. Coupler housing 300 also includes a corresponding pair of opposing E-shaped electromagnets for defining electromagnet coils about the conductors when fully assembled and coupled. The base is mounted to a panel at a location along the data bus 20 of FIG. 1 by a single-motion panel-mounting system of the present invention, at which position the housing receives ambient air flow to cool the electronics in the housing.

Referring to FIGS. 2 to 5 and 20, the coupler base 100 comprises a twisted pair end 102 generally containing a wire nest 202 having wire channels 204,205 along which will be disposed conductors of the twisted pair cable of the data bus 20, retained therein by wire retainers 200 at each cable exit; twisted pair end 102 also includes an aperture 215 within which is disposed securing means 214 for securing coupler housing 300 to coupler base 100. Twisted pair end 102 includes a pair of projections 104, movable mounting means or a pair of mounting body members 106 extending from the coupler base 100, a fixed engaging member 108 located between the twisted pair end 102 and a pivot end 110 opposite the twisted pair end 102. Wire retainers 200 are disclosed in U.S. Pat. No. 5,360,352. Coupler housing 300 includes an array of diagonal fins 302 cooperable with ambient air flow facilitating heat dissipation during in-service use, and is disclosed in U.S. patent application Ser. No. 07/996,762, filed Dec. 24, 1992, and assigned to the assignee hereof.

The twisted pair end 102 further comprises a pair of receiving channels 112, each receiving channel 112 comprising a space between two support walls 116 and a lower surface (not shown) of a projection 104, with a mounting body member 106 insertable into each receiving channel 112. The mounting body member 106 comprisings an engaging section or foot 118 which depends from a horizontal cylinder section 121 and includes an angled foot end 122 on its lower surface, and a locking surface or groove 124 thereinto. The cylinder section 121 has a closed end 126 and an open end (not shown). Extending from the side surfaces 128 of the cylinder section 121 are guide arms 130. As shown in FIG. 2, the inserted mounting body member 106 is positioned into the receiving channel 112 so that the upper surface 132 of each guide arm 130 contacts a lower surface (not shown) of the projection 104, and the lower surface 134 of each guide arm 130 contacts the upper edge 136 of a support wall 116.

Figure 5:
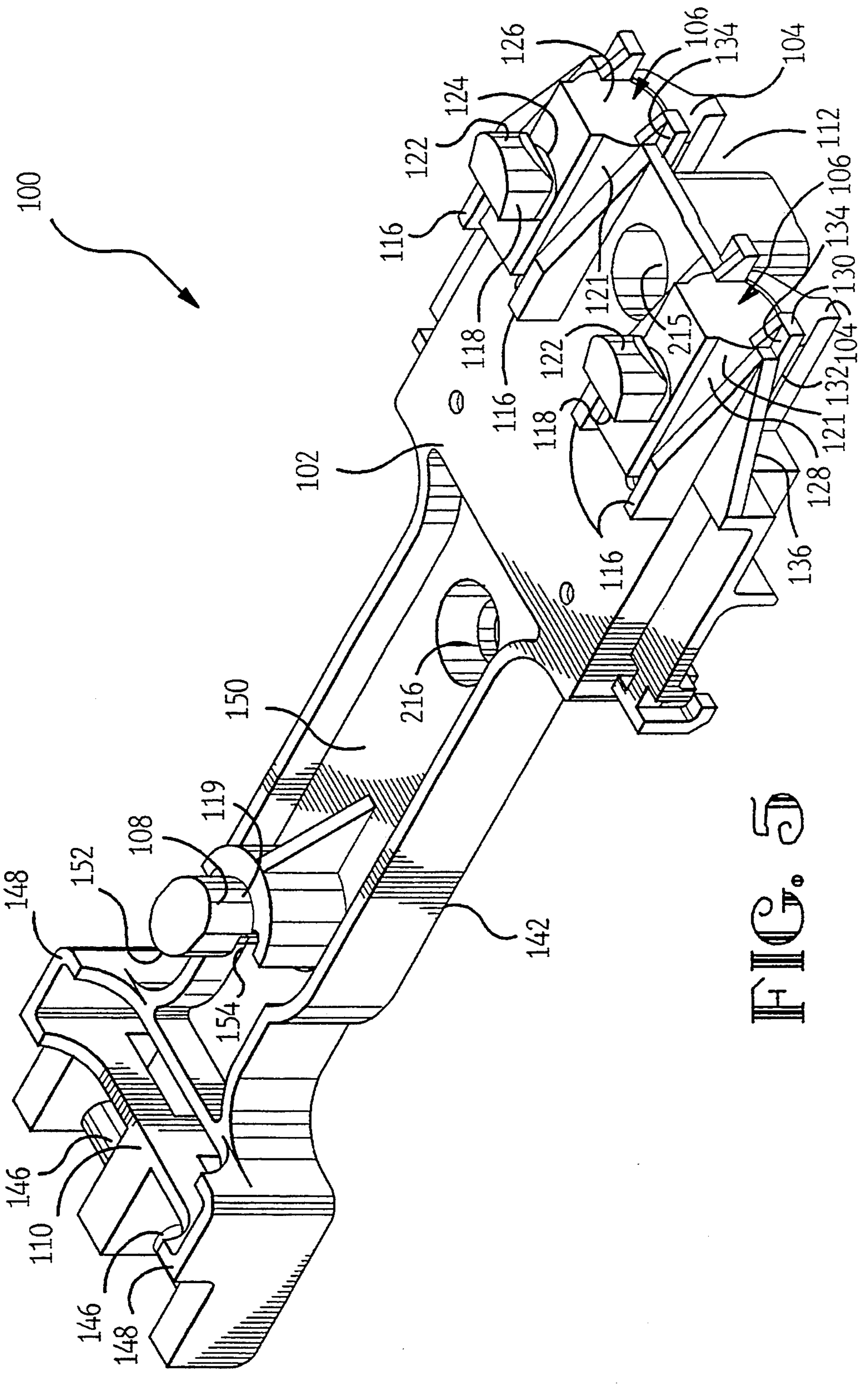
FIG. 5 is a bottom isometric view of a base of a coupler taken from the twisted pair end of the base showing the single-motion mounting means of the present invention.

As further shown in FIG. 5, the pivot end 110 of the coupler base 100 includes a pivot means 146 for securing to a coupler housing 300 (FIG. 2), and a support surface 148 for abutting the adjacent panel surface and providing support when the coupler base 100 is mounted to a panel. The lower surface 150 of the coupler base 100 includes a fixed engaging member 108 comprising an engaging section 119 extending in a downward direction to an angled end 152 on the lower end of the fixed engaging member 108, and a locking surface or groove 154. The fixed engaging member 108 is substantially similar to the engaging section 118 of mounting body member 106 in both structure and function, except that it is fixed to or integral with the coupler base. An aligning recess 216 is shown which receives an aligning post from a coupler housing during coupler assembly, with securing aperture 215 including a securing means 214 which locks the housing to the base by a cooperating securing means thereof, such as a quarter-turn fastener (not shown).

Mounting body members 106 are shown positioned in the receiving channels 112 and each includes a cylinder section 121 comprising a closed end 126 and an open end 158, the open end 158 facing the rear of the receiving channel 112 in which the respective mounting body member 106 is positioned. The lower surface 134 of the guide arms 130 which extend from the side surface 128 of the cylinder section 121 contact the upper edge 136 of a corresponding support wall 116. Support walls 116 extend perpendicularly downward from the bottom of the coupler base 100. Two support walls 116 function to partially define a receiving channel 112. More specifically, the facing surfaces 164 of two support walls 116 partially define the receiving channel 112.

Figure 4:
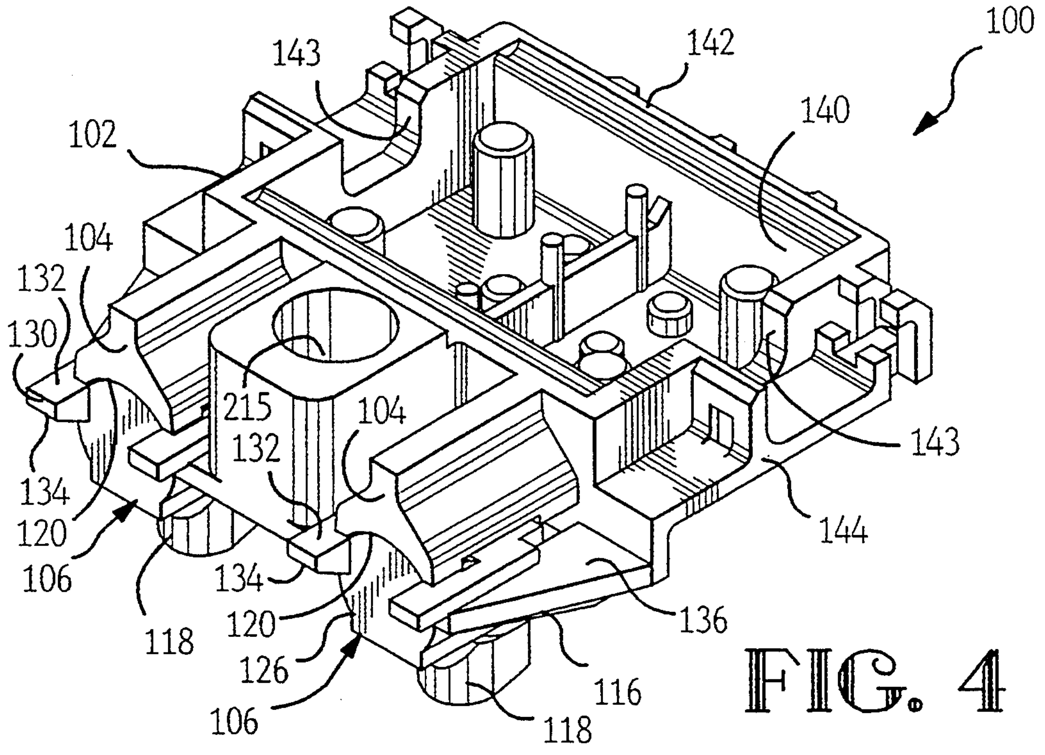

Turning to FIG. 4, a partial top isometric view of the coupler base 100 taken from the twisted pair end 102 of the coupler base 100 with the single-motion mounting system of the present invention is shown. A mounting body member 106 is positioned in the receiving channel defined by each projection 104. The twisted pair end 102 includes an electromagnet receiving cavity 140 on its upper surface 142 with cable exit slots 143 on the side surface 144 for allowing passage of conductors of a twisted pair cable. Positioned in the electromagnet receiving cavity 140 will be a resilient wire nest 202 (FIG. 20) containing electromagnets therein. Projections 104 extend from the front end of the coupler base 100, and the lower surface 120 of each of the projections 104 partially defines a receiving channel 112.

Figure 6:
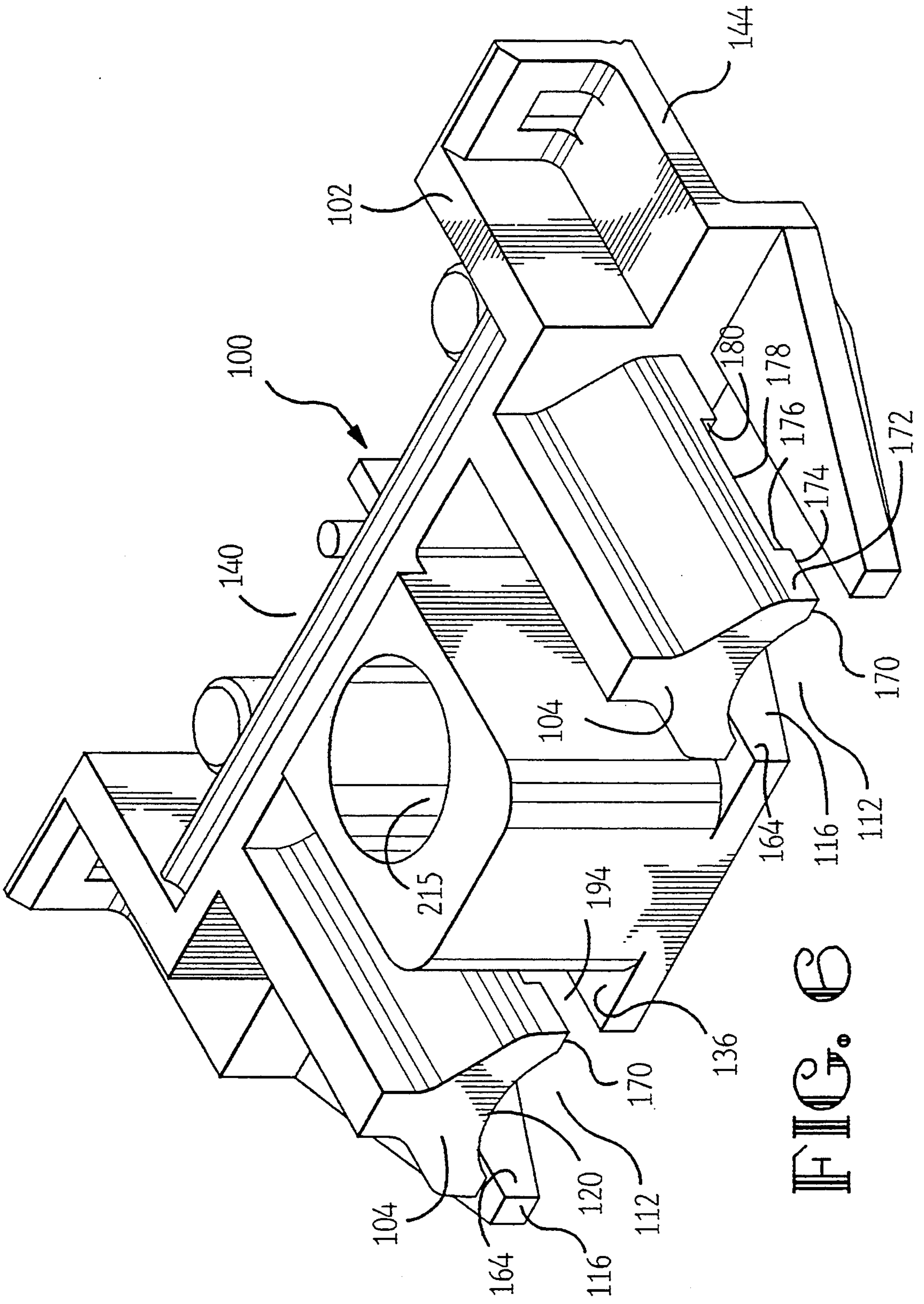
FIGS. 6 and 7 are enlarged top and bottom isometric views of the front end of a twisted pair end of the base of the coupler showing the receiving channels.
Figure 7:
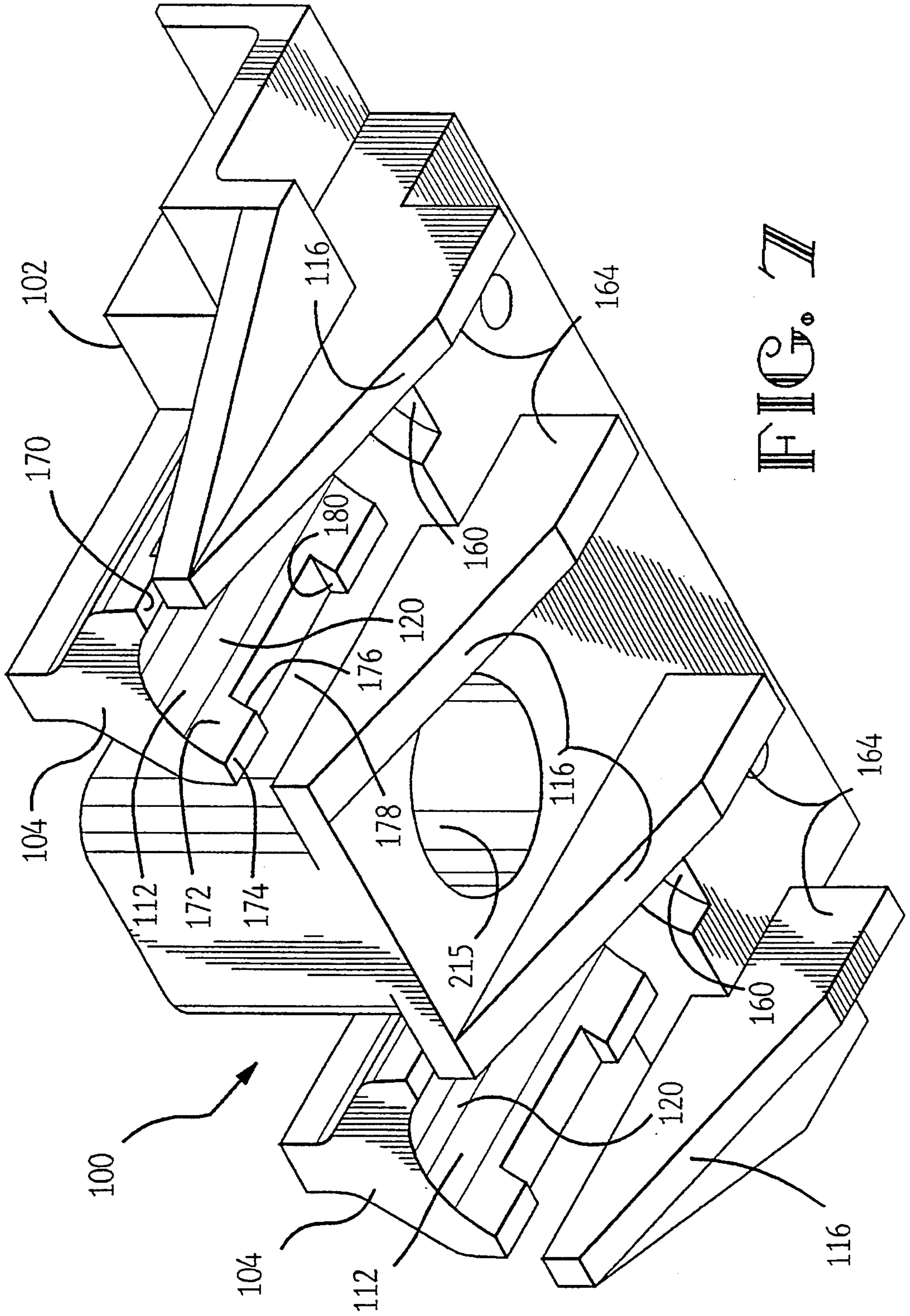

Turning to FIGS. 6 and 7, each receiving channel 112 is defined by the lower surfaces 120 of a projection 104 and the facing surfaces 164 of two corresponding support walls 116. Each projection 104 comprises a lower edge 170 which includes a wedge 172 with an angled lower surface 174 and a locking surface 176. A longitudinal slot 178 is defined by the locking surface 176 and a rearward end 180 on the lower edge 170 of the projection 104, with slot 178 providing a clearance for wedge 182 of mounting body member 106. A vertical space 194 is located between the lower edge 170 of the projection 104 and the upper edge 136 of the support walls 116.

Figure 8:
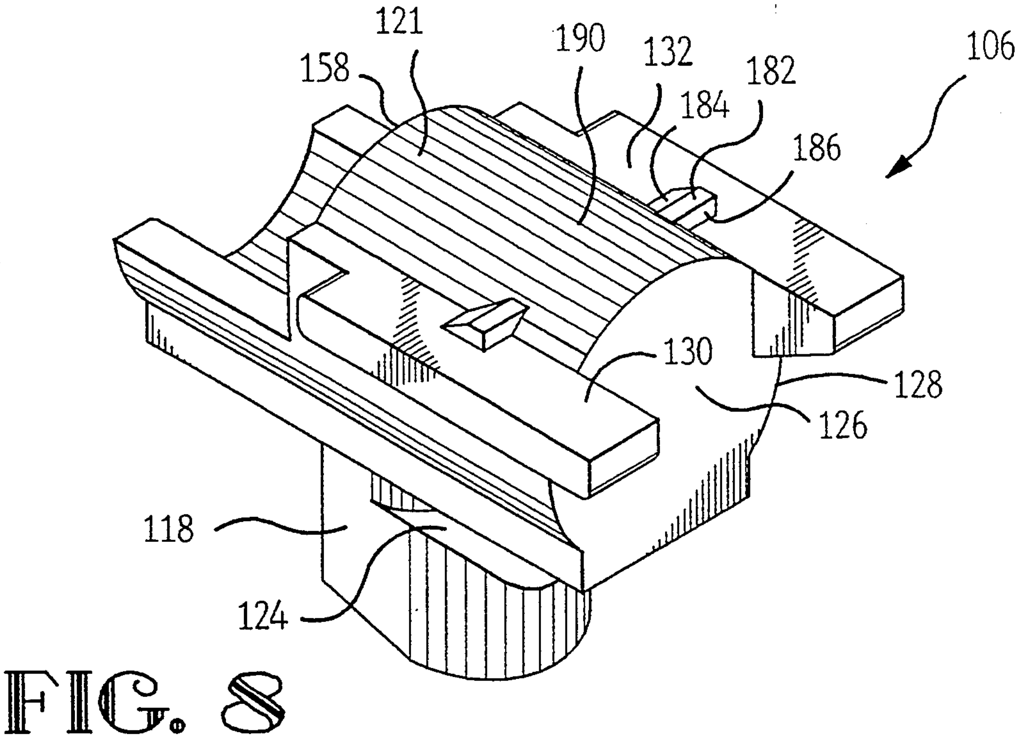
FIGS. 8 and 9 are enlarged front and rear top isometric views of mounting body member of a coupler.
Figure 9:
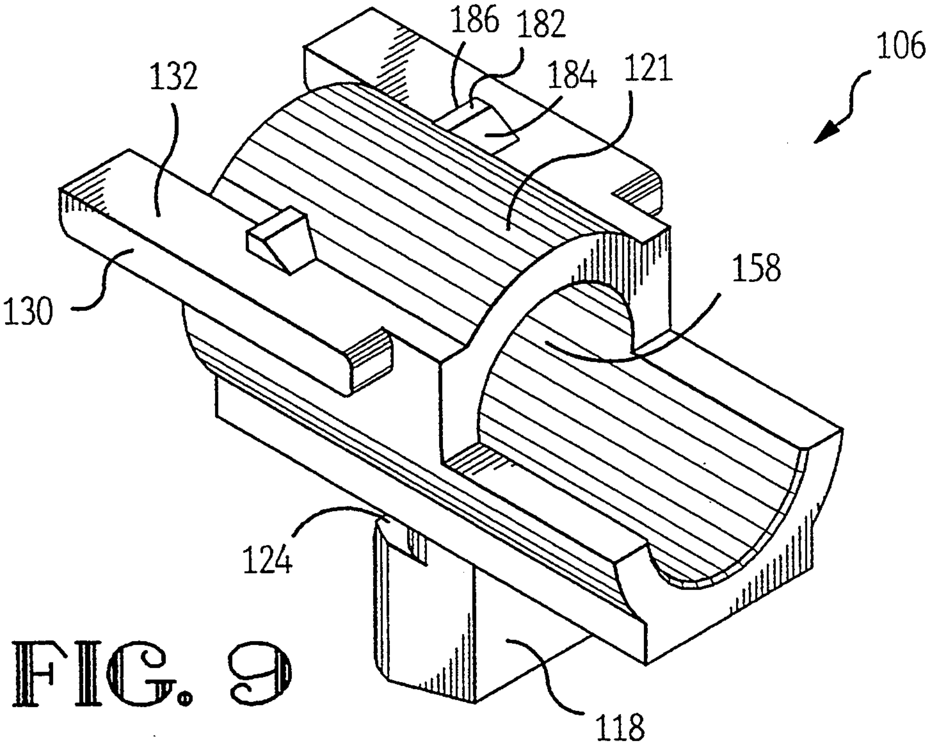

Turning to FIGS. 8 and 9, a preferred embodiment mounting body member 106 of a coupler according to the present invention is shown. Each mounting body member 106 comprises a cylinder section 121 having a closed end 126 and an open end 158 (shown in FIG. 9, an engaging section 118 which extends downward from the cylinder section 121 and includes a groove 124, and guide arms 130 extending from the side surface 128 of the cylinder section 121. Guide arms 130 extend horizontally along the longitudinal axes of the cylinder section 121, and are located at positions equidistant from the top surface 190 of the cylinder section 121. On the upper surface 132 of each guide arm 130 is a wedge 182 having an angled surface 184 and a locking surface 186.

Figure 10:
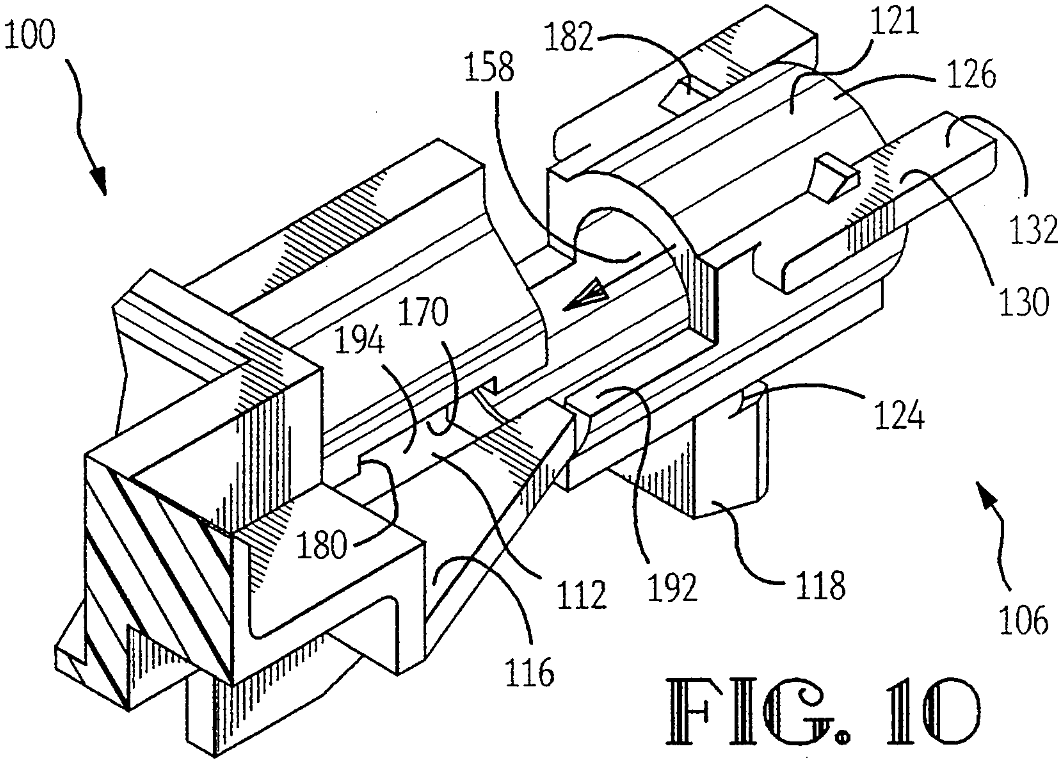
FIGS. 10 and 11 are enlarged top isometric views of a mounting body member partially and fully inserted into a receiving channel of the twisted pair end of a coupler base.
Figure 14:
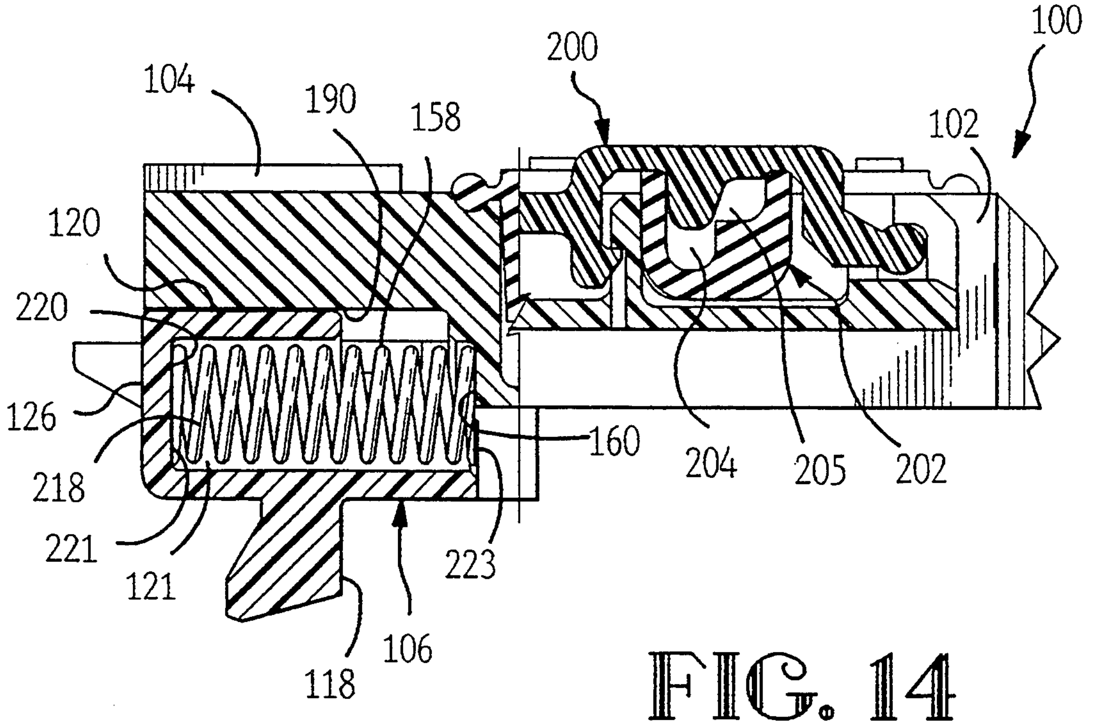
FIGS. 14 and 15 are partial cross sectional views showing the position of a mounting body member when no force is applied to move the mounting body member, and when force is applied compressing the spring.
Figure 15:
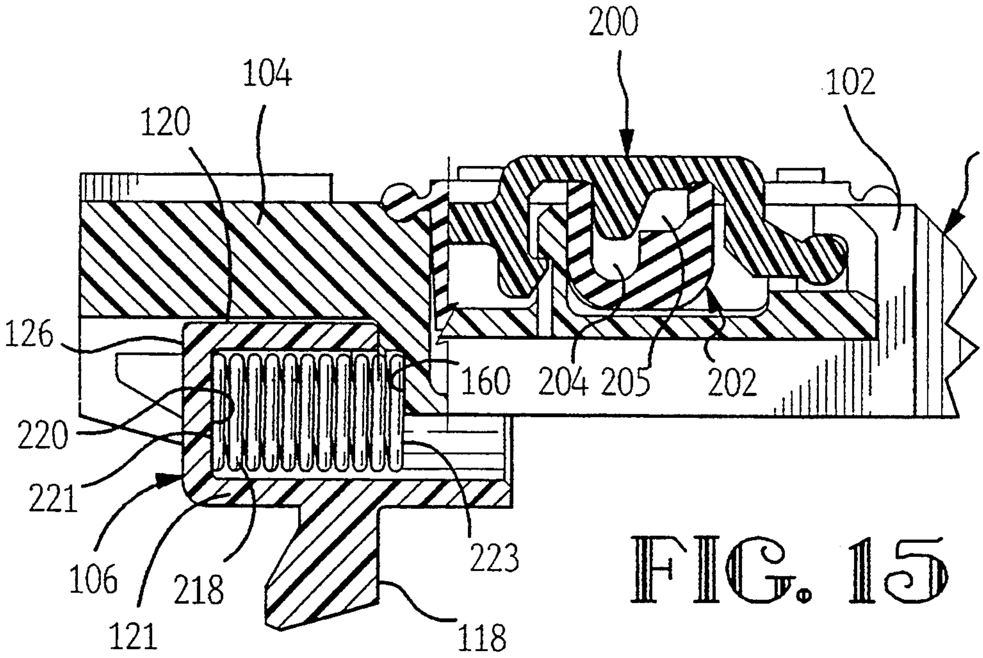
Figure 16:
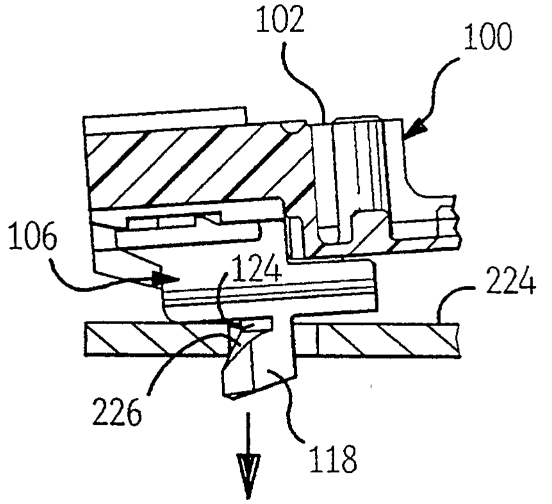
FIG. 16 is an enlarged partial cross-sectional view of a mounting body member shown in FIGS. 14 and 15.

Turning to FIG. 10, an enlarged top isometric view of a preferred embodiment of a mounting body member 106 is shown partially inserted into a receiving channel 112 of the twisted pair end 102 of the coupler base 100. The mounting body member 106 of this embodiment includes guide arms 130 with a wedge 182 on their upper surface 132, a cylinder section 121 having a closed end 126, an open end 158, an extended lower portion 192, and an engaging section 118 with a groove 154. The open end 158 of the cylinder section 121 of the mounting body member 106 faces the receiving channel 112 of the coupler base 100. A vertical space 194 is located between the lower edge 170 of the projection 104 and the support wall 116. In this embodiment, the mounting body member 106 is slidably mounted in the receiving channel 112, with lower surface 134 of each guide arm 130 opposing and engaging an upper edge 136 of a corresponding support wall 116, and upper surface 132 opposing and engaging a corresponding lower edge 170 of a corresponding projection 104. (During assembly, a biasing means such as a compression spring will be disposed along channel 158 and be trapped in receiving channel 112 between closed end. 126 and rear surface 160, as seen in FIGS. 14 and 15.)

Figure 11:
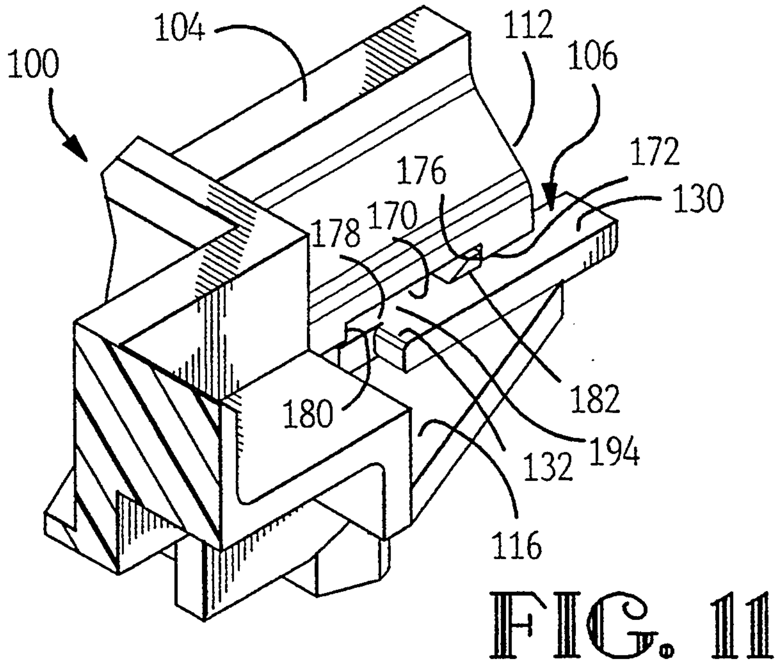

Turning to FIG. 11, an enlarged top isometric view of a mounting body member 106 is shown fully inserted into a receiving channel 112 of a coupler base 100 according to the present invention. The guide arms 130 are positioned in the vertical space 194 between the lower edges 170 of the projection 104 and the support walls 116 defining the receiving channel 112. The wedge 182 on the upper surface 132 of the guide arm 130 is positioned within the longitudinal slot 178 of the lower edge 170 on the projection 104. When in this position, the wedge 182 on each guide arm 130 functions to prevent removal of the mounting body member 106 from the receiving channel because the locking surface 186 of the wedge 182 on the guide arm 130 is facing the locking surface 176 on the wedge 172 of the projection 104. The wedge 182 on the guide arm 130 of the mounting body member 106, however, can move freely along the length of the longitudinal slot 178. As a result, the mounting body member 106 is slidably fixed within the receiving channel.

Figure 12:
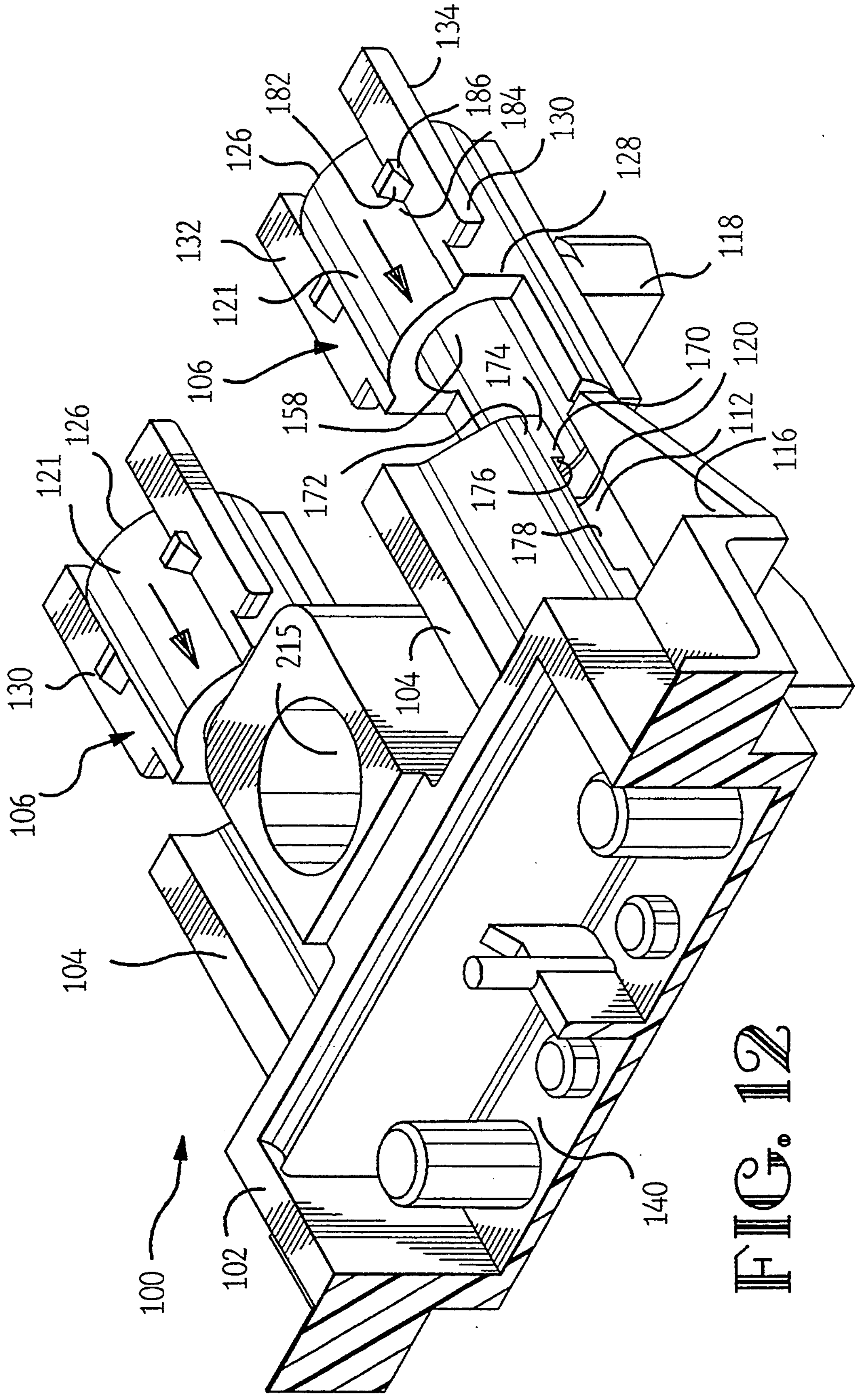
FIG. 12 is an enlarged top isometric view of mounting body members partially inserted into receiving channels of a coupler base.

Turning to FIG. 12, an enlarged top isometric view of the mounting body sections 106 are shown according to a preferred embodiment of the present invention partially inserted into receiving channels 112 with the coupler base. Prior to insertion of the mounting body member 106 into the receiving channel 112, the angled surface 184 of the wedge 182 on the guide arm 130 faces the angled surface 174 of the wedge 172 on the edge 170 of the projection 104 to allow each of the wedges 172,182 to pass over each other upon insertion.

Returning to FIG. 11, in this embodiment, the wedge 182 is shaped as a right triangle with the portion perpendicular to the guide arm 130 forming the locking surface 186 and the side across from the right angle forming the angled surface 184. Additionally, the longitudinal slot 178 located on the lower edge 170 of the projection 104 forms a locking surface 176 which is also perpendicular to the inserted guide arm 130, and parallel to the locking surface 186 of the wedge 182 on the guide arm 130.

As can be seen in FIGS. 10 to 12, some degree of force is required to insert the mounting body member 106 into the receiving channel. More specifically, this is because upon insertion of the guide arms 130 into the vertical space 194 between the support walls 116 and the edges 170 of the lower surface 120 of the projection 104, the wedge 172 on the edge 170 of the projection 104 must pass over the wedge 182 on the guide arm 130, forcing the projection 104 in the upward direction. Once the wedge 182 on the guide arm 130 passes under the wedge 172 on the projection 104 and into the longitudinal slot 178, the projection 104 returns to the normal unstressed position. As a result, the wedge 182 of the mounting body member 106 is located within the longitudinal slot 178 and the mounting body member 106 moves slidably and freely along the length of the longitudinal slot 178. However, removal of the mounting body member 106 from the receiving channel 112 is hindered by the locking surface 176 of the wedge 172 on the projection 104 which opposes the locking surface 186 of the wedge 182 of the mounting body member 106. As shown in FIG. 11, when the mounting body member 106 is in the fully extended position (i.e., the maximum distance from the front end of the coupler base 100, the locking surfaces 176,186 of both the wedge 182 on the guide arm 130 and the projection 104 engage each other thereby preventing the removal of the mounting body member 106 from coupler base 100.

Figure 13:
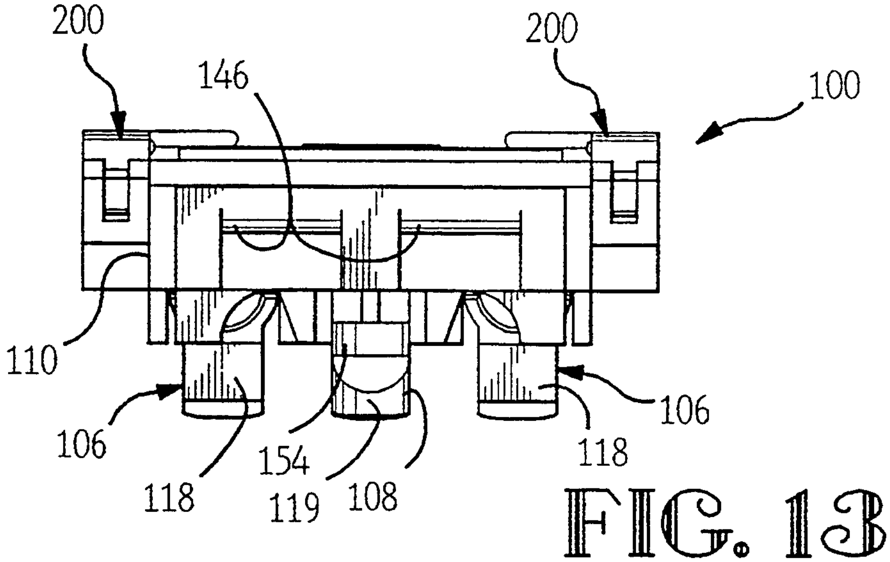
FIG. 13 is a rear view of a base of a coupler showing the single-motion mounting means of the present invention.

Turning to FIG. 13, a rear view of a coupler base 100 showing the single-motion mounting means of the present invention, the pivot end 110 containing pivot means 146, and the ends of the wire retainers 200. Mounting feet 106 and a fixed engaging member 108 are shown extending downwardly from the base 100, and groove 154 of the fixed engaging member 108 can be seen.

Turning to FIGS. 14 and 15, the wire retainer 200 is shown in the closed position over the wire receiving channels 204,205 within the elastomeric wire nest 202. A resilient bias means such as compression spring 214 has been disposed within a cylinder section 121 of each mounting body member 106 which allows single-motion mounting. The mounting body member 106 includes a cylinder section 121 having an open end 158 and a closed end 126, the top surface 190 of the cylinder section 121 contacting the lower surface 120 of a projection 104. Spring 218 is positioned between the mounting body member 106 and the twisted pair end 102 of the coupler base 100; specifically, the spring 218 is positioned in the cylinder section 121 of the mounting body member 106 such that one end 221 of the spring 218 contacts the inner surface 220 of the closed end 126 of the cylinder section 121 and the other end 223 contacts the rear surface 160 of the receiving channel 112.

In FIG. 14 is illustrated the position of the mounting body member when no force is applied, while in FIG. 15 force is applied to the mounting body member 106 from forwardly of the front end of the coupler base compressing the spring 218, such as would occur during panel mounting of base 100. The spring 218 is compressed by the force, and by being between the mounting body member 106 and the coupler base 100 the spring tends to urge mounting body member 106 away from the rear surface 160.

Figure 17:
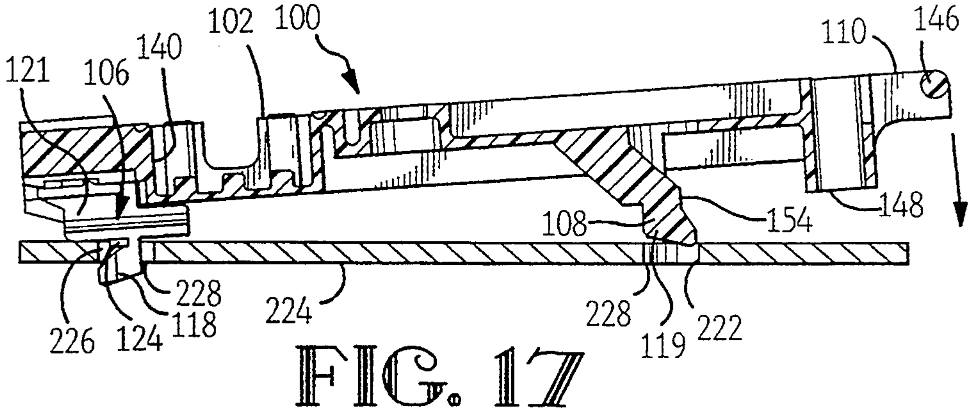
FIG. 17 is a cross-sectional view of a coupler base showing the single-motion mounting means being initially positioned onto a panel.

FIGS. 16 to 19 illustrate the preferred embodiment of the single-motion mounting means being initially positioned and then fully mounted onto a panel 224,224'. The single-motion mounting means comprises a fixed engaging member 108 connected to the coupler base 100 and a mounting body member 106. The mounting body member 106 is slidably mounted to an end of the coupler base 100 and has a downwardly extending engaging section 118 with a groove 124. The mounting cylinder section 121 includes a resilient bias means. Fixed engaging member 108 has an downwardly extending engaging section 119 with a groove 154. The groove 124 of the mounting means 106 engages a corresponding engagement surface 226 in a securing aperture 228 on the panel 224, and the groove 154 engages a corresponding engagement surface 227 in a securing aperture 228 of the panel 224. As shown in FIG. 17, a mounting body member 106 which includes an engaging section 118 with a groove 124 which engages a corresponding engagement surface 226 in a securing aperture 228 of the panel 224. A force is applied to compress the spring in the mounting body member 106 to insert the mounting body member 106 into the corresponding securing aperture 228 in the panel 224, when engaging sections 118 partially contacts the engaging surfaces or edges 226 about the periphery of the panel holes. In this way the mounting body member 106 and the fixed engaging member 108 are positioned adjacent to the predetermined engagement surfaces 226,227 of the panel 224.

Figure 18:
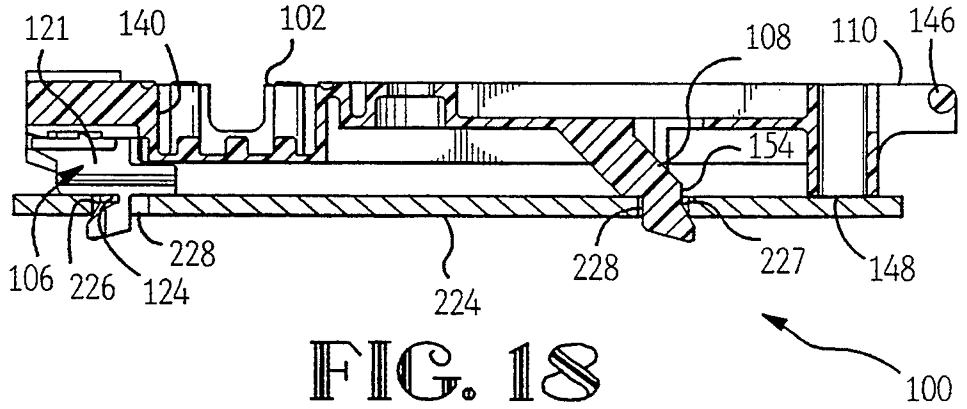
FIGS. 18 and 19 are cross-sectional views of a coupler base showing the single-motion mounting means fully mounted onto respective panels of varying thickness.

FIG. 18 is a cross-sectional view of coupler base 100 fully positioned onto a relatively thick panel 224. Mounting body member 106 is positioned in a corresponding securing aperture 228 so that the groove 124 of the mounting body member contacts the engagement surface 226. Similarly, fixed engaging member 108 is positioned above a corresponding securing aperture 228 so that the groove 154 of fixed engaging member 108 is in contact with the engagement surface 227 of the securing aperture 228 of the panel 224. In FIG. 18, force is applied to the coupler base 100 by decompression of the springs in mounting body members 106 thereby increasing the distance between mounting body members 106 and the fixed engaging member 108 and locking the mounting base to the panel.

Figure 19:
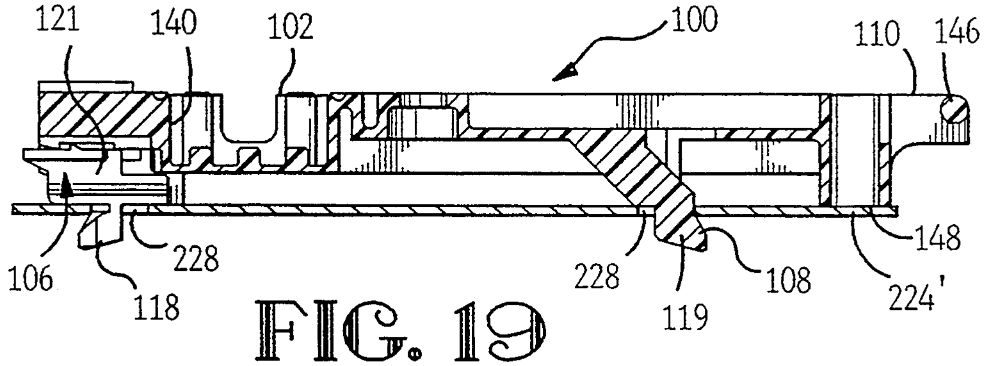

Turning to FIG. 19, a cross-sectional view of a coupler base is shown, showing the single-motion mounting means fully positioned onto a relatively thin panel 224'. Upon insertion of mounting body members 106 and fixed engaging member 108 into their corresponding securing apertures 228 of panel 224', in this embodiment a thinner panel, each resilient bias means within cylinder section 121 of the mounting body members 106 exerts a force between the respective mounting body member 106 and fixed engaging member 108 in opposite directions to increase the distance between fixed engaging member 108 and mounting body members 106. After positioning both the mounting body members 106 and fixed engaging member 108 within their respective corresponding engagement surfaces 226,227, the force is released and the springs expand to force the grooves 124 of the mounting body members 106 into engagement with the corresponding engagement surfaces 226 of panel 224', and groove 154 of fixed engaging member 108 into engagement with the corresponding engagement surface 227 of panel 224. The springs apply a force between the mounting body members 106 and fixed engaging member 108 in a direction opposite each other. In this way, the coupler base 100 is securely fixed into the panel 224,224' through an easily performed single action mounting operation.

Figure 20:
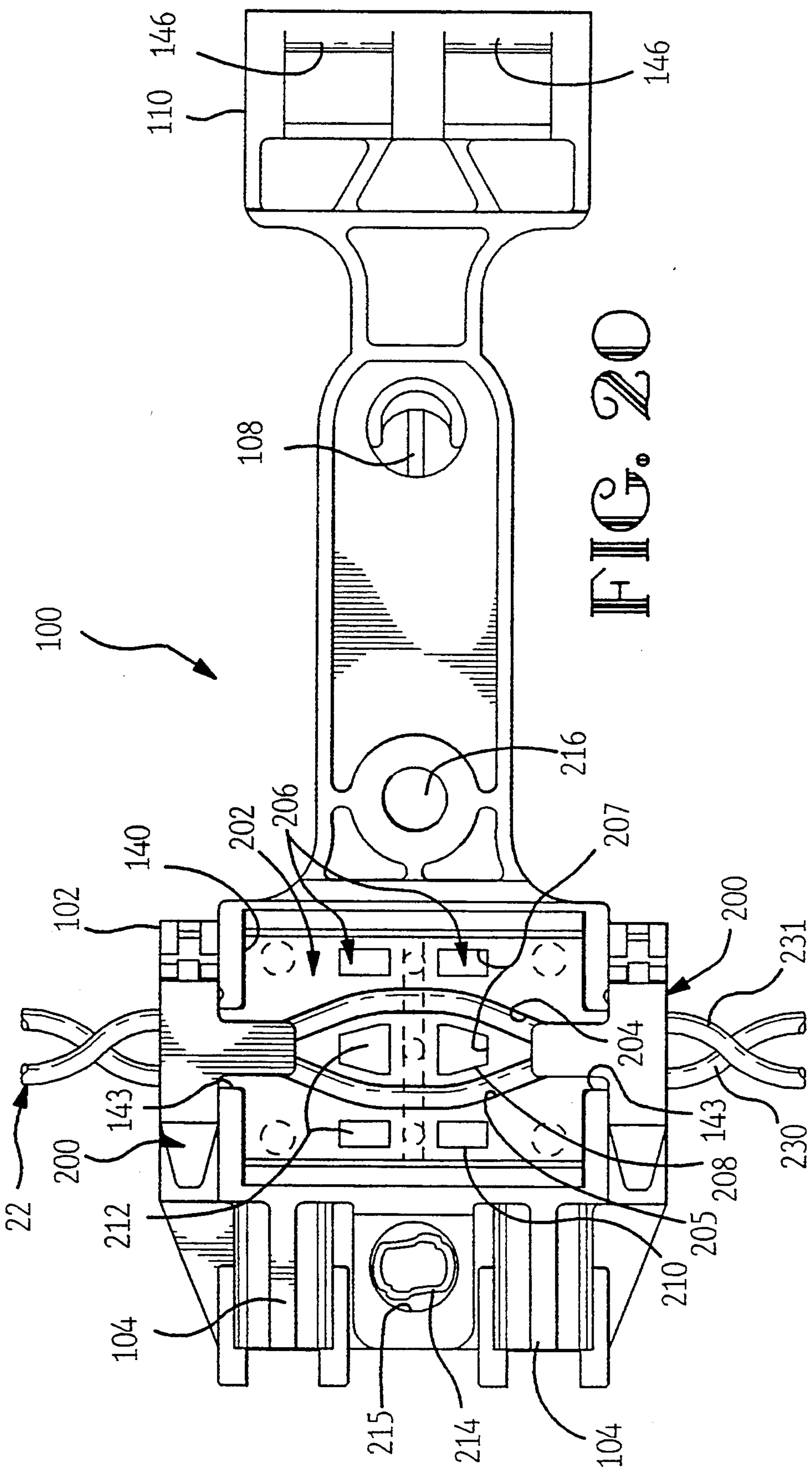
FIG. 20 is a plan view of a base of a coupler showing conductors of the twisted pair cable extending therethrough.

Turning to FIG. 20, a top plan view of the coupler base 100 is illustrated. The coupler base 100 includes a twisted pair end 102 having projections 104 utilized with the mounting system; a wire nest 202 disposed in cavity 140 having a pair of electromagnets 206 and a pair of hinged retainers 200 for securing the wires 230,231 within wire channels 204,205 of elastomeric wire nest 202 at the coupler's cable exits 143; a fixed engaging member 108 and a pivot end 110 whereat pins 146 are located.

Securing posts are shown in phantom which enter apertures in the elastomeric wire nest 202 in the electromagnet receiving cavity 140 for stabilizing the elastomeric material and thus the electromagnets, with the elastomeric wire nest 202 secured in cavity 140 by adhesive material. Each electromagnet 206 comprises a center leg 208 and two outside legs 210, which legs 208,210 extend upwardly from a crossing section and through leg-receiving holes 207 through the wire nest 202 and terminate in mating faces 212.

As shown in FIG. 20, coupler base 100 includes an aligning recess 216 to receive an upper member aligning means (not shown). Pivot pins 146 positioned at the pivot end 110 of the coupler base 100 cooperate with projections extending from the pivot end 342 of a coupler housing 300 in the assembled current mode coupler 30, as seen in FIG. 2. A securing aperture 215 is defined in coupler base 100 and includes securing means 214 for attaching the coupler base 100 to a coupler housing 300 by means of a quarter-turn fastener (not shown), for example, of the type sold by Southco, Inc. of Lester, Pa. under Part Nos. 82-11-240-16, 82-32-101-20, and 82-99-205-15.

Referring to FIGS. 2 and 20, aligning aperture 216 in coupler base 100 receives thereinto an aligning post depending from the coupler housing assembly. A pivot end 342 of coupler housing 300 includes projections for fixing the pivot end 342 to pivot end 110 of coupler base 100. Also on the pivot end 342 is an aperture for allowing an electrical connection between the electronics package within housing 300 and a control unit. A securing means such as a quarter-turn fastener at front end 310 of coupler housing 300 opposite the pivot end 342 allows for securing to coupler base 100 upon entering a socket 214 in aperture 215. Preferably, heat transfer fins 302 extend from the outer surface of coupler housing 300.

Coupler housing 300 also includes preferably a pair of E-shaped electromagnets each with a center leg and two outside legs terminating in mating faces which, upon assembly, mate with the mating faces 212 of the pair of electromagnets 206 in the electromagnet receiving cavity 140. The mating face of the center leg of each electromagnet in the coupler housing mates with the mating face 212 of the center leg 208 of a corresponding electromagnet 206 in coupler base 100, and each outside leg of each electromagnet in the coupler housing mates with a corresponding mating face 212 of a corresponding electromagnet 206 in coupler base 100, all forming a pair of electromagnet channels through which are routed the conductors of the twisted pair cable.

Variations of the embodiments described above are possible. The coupler base is preferably formed from molded dielectric plastic material, such as nylon, or a liquid crystal polymer ("LCP"). Similar to the base, the mounting body members are preferably formed from molded dielectric plastic material, such as nylon, or a liquid crystal polymer.

Figure 21:
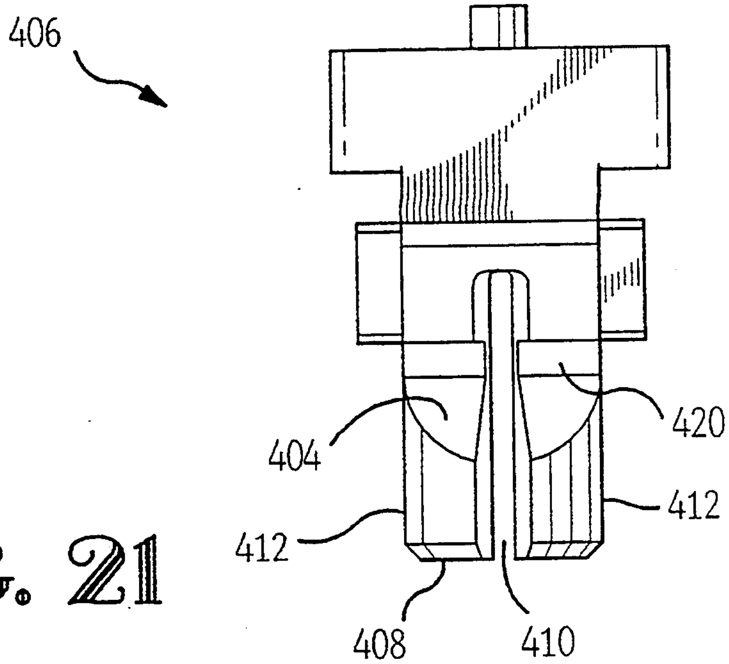
FIGS. 21 to 25 are front, bottom, top side and cross-sectional views illustrating an alternative embodiment of mounting body member of the present invention.
Figure 22:
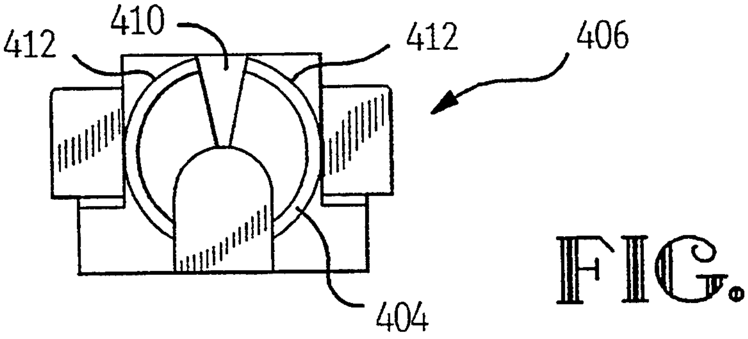
Figure 23:
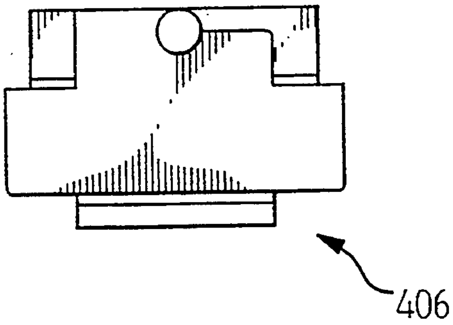
Figure 24:
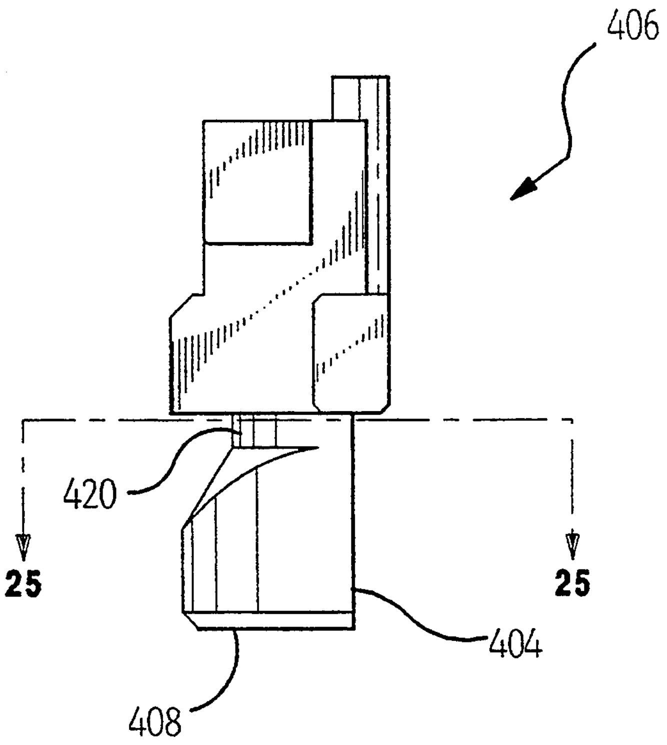
Figure 25:
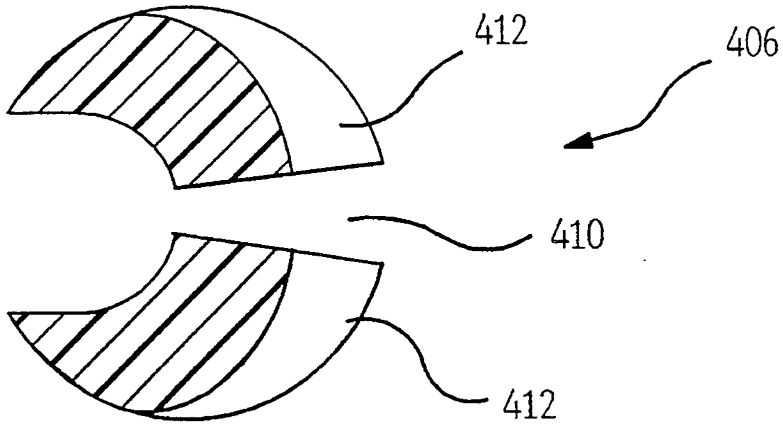

Variations of the mounting feet are also envisioned. For example, the mounting body member can be formed in the shape of an "elephant" foot, as shown in FIG. 7, or alternatively, a split hoof mounting body member 406 as illustrated by FIGS. 21 to 25. FIG. 21 shows a front plan of an alternative embodiment of a mounting body member having a split hoof according to the present invention. The mounting body member 406 including as an engaging section a V-shaped notch 410 running the length of the bottom surface 408 of the mounting body member. The V-shaped notch 410 functions to divide the mounting body member 406 into two separate elements 412 so as to form a split hoof. The split hoof provides an engaging member 404 capable of limited movement so as to allow the engagement of the engaging member 404 with panel engaging surfaces which vary slightly from the design specification position. The position of the panel engaging surfaces may vary due to the panel being slightly arcuate, as is common in aircraft. Preferably, separate elements 412 are formed so as to be equidistant from a center axis so as to form equal and opposite elements 412.

In another variation, the coupler base may comprise a multiple fixed engaging member located between the twisted pair end and the pivot end. Similar to the first fixed engaging member, the second fixed engaging member extends in a downward direction from the coupler base and comprises an angled surface on the lower end of the fixed engaging member, and a groove. The second fixed engaging member also engages a corresponding engaging surface in a securing aperture of the panel so as to provide additional means of securing the coupler base to a panel. As a result, in the event that one of the fixed engaging members fractures during operation, the coupler base remains secured to the panel by the other fixed engaging member.

In yet another variation, the coupler base may comprise only one or a plurality of movable engaging members. The use of one movable engaging member may be accomplished by positioning the movable engaging member in a receiving cavity which is formed in the center of the twisted pair end of the coupler base, and preferably utilizing a pair of fixed engaging members proximate the opposed pivot end of the coupler base.

As is understood from the specification, the housing may be mounted on a vertical wall, a ceiling or floor, or in any position so that the air flow is received into the heat transfer fin channels. Moreover, a coupler according to the present invention may be mounted in any manner in addition to the parallel, horizontal or flat mount methods described herein which are commonly utilized in the art, for example, by flush mounting.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. A movable mounting means affixable to an article, comprising:

a cylinder section having a closed end and an open end, said cylinder section capable of receiving a spring therewithin extending from said closed end and beyond said open end, and said cylinder including a lower portion extending from said open end supporting at least a portion of said spring in an uncompressed condition;

an engaging section extending downward from said cylinder section having an angled end and a groove; and guide arms extending outward from the side surface of said cylinder section and cooperable with said article during movement of said cylinder section relative thereto between a first position and a second position for guiding thereof, said guide arm having on an upper edge thereof a locking section cooperable with said article to define the first position wherein said spring is generally uncompressed, whereby during mounting of said article to another article engaged by said engaging section, said cylinder section is movable with respect to a mounting face of said article, between the first position wherein said spring is generally uncompressed and the second position wherein said spring is compressed against said closed end by said article as said lower portion underlies said mounting face of said article.

2. The movable mounting means of claim 1, adapted to be received by a corresponding receiving means in a coupler base.

3. The movable mounting means of claim 2 wherein said locking section is at least one wedge disposed on a said upper edge of a said guide arm and including a locking surface.

4. The movable mounting means of claim 3, wherein said mounting means is adapted to be received in said receiving means in such a way so that said wedge on the upper edge of said guide arm contacts a corresponding wedge on said coupler base in such a way to prevent removal of said movable mounting means from said receiving means.

5. The use of the movable mounting means of claim 1 in a coupler base.

6. The use of the movable mounting means of claim 1 in connection with a coupler base designed for use in aircraft.

* * * * *